H. D. LILLIBRIDGE.
METHOD OF AFFORDING PROTECTION TO WORKMEN DURING THE OPERATION OF SPRAYING CERAMIC AND OTHER ARTICLES.
APPLICATION FILED JULY 28, 1913.
1,223,809.
Patented Apr. 24, 1917.
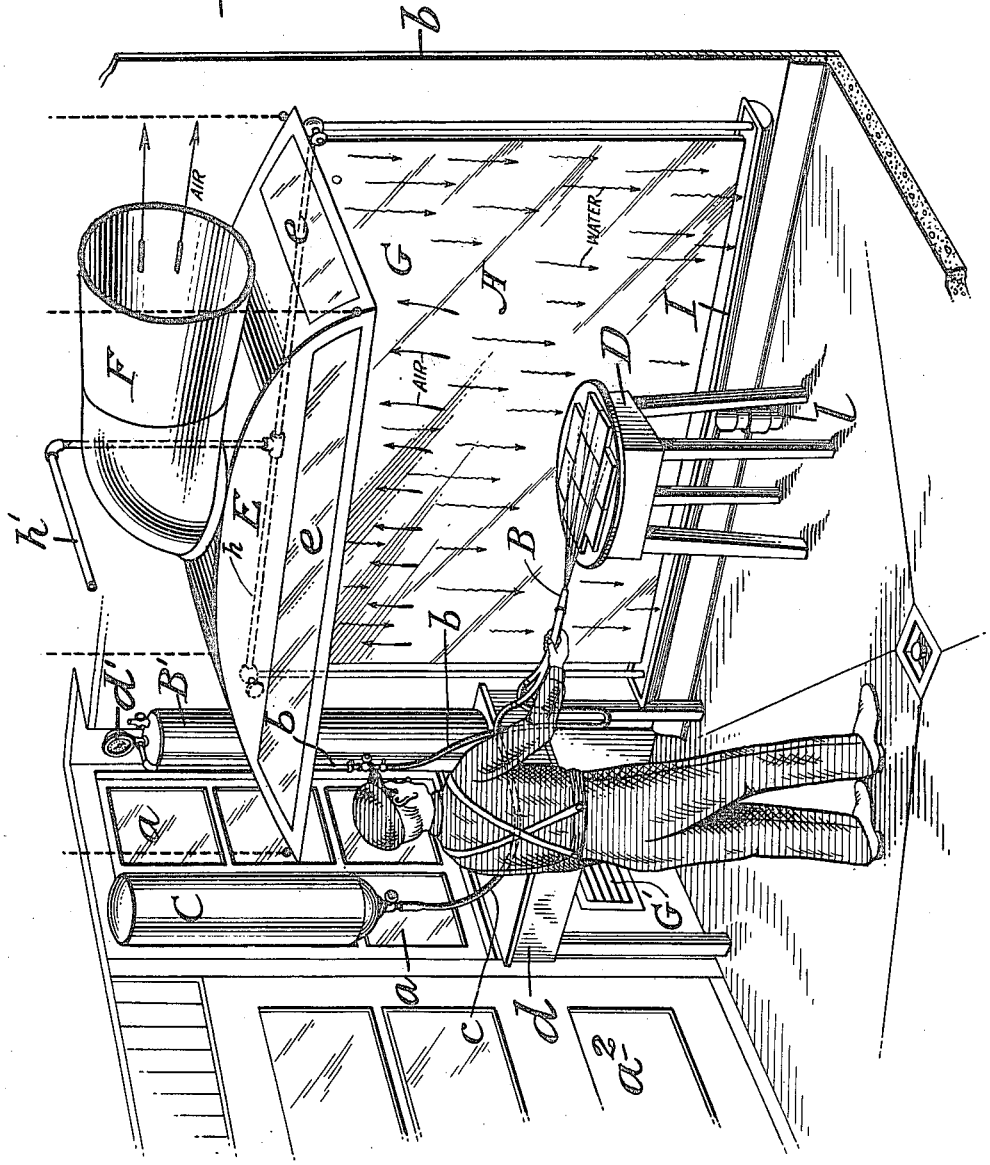
Witnesses:
A. R. Appleman
M. C. Rodriguez
Inventor,
HARRY D. LILLIBRIDGE,
By his Attorneys
Griffin Bernhard

UNITED STATES PATENT OFFICE.

HARRY D. LILLIBRIDGE, OF ZANESVILLE, OHIO, ASSIGNOR TO AMERICAN ENCAUSTIC TILING COMPANY, LTD., OF NEW YORK, N. Y., A CORPORATION OF NEW YORK.

METHOD OF AFFORDING PROTECTION TO WORKMEN DURING THE OPERATION OF SPRAYING CERAMIC AND OTHER ARTICLES.

1,223,809. Specification of Letters Patent. Patented Apr. 24, 1917.

Application filed July 28, 1913. Serial No. 781,500.

*To all whom it may concern:*

Be it known that I, HARRY D. LILLIBRIDGE, a citizen of the United States, residing at Zanesville, county of Muskingum, and State of Ohio, have invented a certain new and useful Method of Affording Protection to Workmen During the Operation of Spraying Ceramic and other Articles, of which the following is a specification.

This invention is a process of carrying off poisonous waste matter during the operation of spraying ceramic and other articles with a decorative coloring substance, so as to prevent the workman engaged in the performance of the work, or others in adjacent apartments, from inhaling the air which may be charged more or less with such poisonous coloring matter.

In the art of decorating tiles and other articles of ceramic ware, as well as in numerous occupations, it is common to apply coloring matter, such as pigments and glaze, to the surfaces of the articles by means of a spray produced by atomizing the coloring substance with the aid of compressed air. Such operations expose the workmen to the danger of inhaling air which may contain more or less of the sprayed substance, the effect of which inhalations on the human system are quite injurious owing to the poisonous nature of the sprayed substance.

For hygienic and sanitary reasons, it is desirable to carry off or eliminate the waste sprayed substance which fails to adhere to the articles under treatment, thus preventing the workman from inhaling the sprayed matter. In this invention, such waste sprayed matter is so thoroughly eliminated, and is removed under such conditions, that none of the spray can be inhaled by the workman immediately engaged in the work nor by other workmen employed in rooms adjacent to that in which the spraying is being conducted.

The process of this invention includes two distinctly novel steps of procedure, first, conducting the operation of spraying the work in a chamber isolated from other work rooms and circulating through such chamber a current of air, preferably drawn into the chamber from more than one direction so as to envelop the workman engaged in the spraying operation within a zone of air flowing continuously around him so as to catch up and carry off all the atomized or sprayed matter which may rebound from the article when the spray is forcibly projected against the surface of said article; and, second, in the employment of a spray absorbing medium adjacent to the work under treatment and toward which medium the sprayed material is directed or thrown, so that any of the spray which eludes or passes beyond the work under treatment will become absorbed by the aforesaid spray absorbing medium, as a result of which operations all the waste sprayed matter will either be carried off by the circulation of air or be taken up by the absorbing medium, so that none of the sprayed matter will remain suspended in the air to be inhaled by the workman in the spraying chamber or in a work room adjacent thereto.

Obviously, various expedients may be resorted to for securing the spray absorbing medium, such as a moistened fabric suspended in the path of the sprayed matter; but it is preferred to position a panel or background in the path of the spray, and to continuously circulate a liquid, such as water, over the surface of the background, such liquid producing a curtain or film which acts to flush or wash off any matter which may adhere to the panel and to absorb the coloring matter as the spray strikes it, thus preventing the spray from rebounding from the slab and at once absorbing the sprayed matter, the flow of the liquid being controlled so as to carry off the deleterious substance.

Other features and advantages of the invention will appear from the following detailed description.

In the drawing there is shown an apparatus suitable for carrying out the process of this invention, wherein—

Figure 1 illustrates, partly in perspective and partly in section, the spraying chamber within which are conducted the operations of spraying the work with suitable coloring matter, absorbing some of the waste matter by a curtain of spray absorbing liquid, and carrying off other waste matter by the circulation of air around the workman.

Fig. 2 is a detail section illustrating a part of the background, the liquid spray pipe, and a part of the hood.

It may be stated that the method may be carried into practice by various forms of apparatus, one of which is shown in the accompanying drawing and which apparatus is disclosed more fully in a sanitary tile spraying chamber which forms the subject matter of a separate application filed by me on even date herewith.

It is preferred to conduct the operation of spraying tiles, ceramic ware generally, or other kinds of work, within a chamber A, the same being isolated from the other room or rooms wherein other workmen are engaged. This chamber A is shown as being illuminated by light admitted through windows $a$ and it may be artificially illuminated, as disclosed in my companion application Serial No. 781,501, access to said chamber being obtained through a door $a^2$.

The means for producing the spray may be usual in the art, such as a nozzle or "air brush" B to which is connected an air hose $b$ and a liquid hose $c$, the former being attached to a tank B' supplied with compressed air, whereas hose $c$ is attached to a tank C containing the desired liquid matter. The action of the air supplied to nozzle B upon the liquid conveyed to said nozzle results in a spray which is thrown or projected forcibly against the surfaces of the objects under treatment. The sprayed matter is projected under such pressure that some of it rebounds from the work and toward the operator, while other portions of the spray are projected beyond the objects. It is this waste sprayed matter which it is necessary to eliminate so as to prevent inhalation thereof by the workmen.

The objects or work may be supported by any means suitable for the purpose and in a position convenient for the workman to throw the spray thereon. I may use a rack of special design for holding a number of tiles in front of the workman, but as shown the work is adapted to be placed upon a rotatable table D.

The spraying operation is conducted by the workman beneath a hood E, the latter being suspended within chamber A and at a suitable distance above the work holding rack or table. To this hood is connected an exhaust flue or conduit F, from which air is exhausted by a suitable blower or exhauster. It is preferred to employ a hood provided with panes $e$ of glass and to illuminate the space below said hood, as disclosed in my aforesaid application, although these devices are optional.

Air is admitted to the spraying chamber by one or more ventilators G' provided in one or more walls of said chamber. Each ventilator is shown and described in my companion application as embodying blades pivoted for movement by the pressure of air so that the inflow of air to chamber A when the exhauster is operating will open the blades of the ventilators but the flow of air in a direction outwardly from the chamber and through the ventilators will close the blades, thus preventing the outflow of poisonous or objectionable air into the adjoining room or rooms. It is preferred to employ ventilators in two or more walls of the spraying chamber in order that the air may flow from several directions through the chamber and sweep upwardly into and through the suspended hood when the exhauster is in motion, as a result of which the workman actively engaged in handling nozzle B and spraying the work will be enveloped, as it were, in a zone of air which catches up the sprayed matter that rebounds from, or is reflected off, the surface of the work, so that such waste spray will be at once carried out of the chamber by the air flowing upwardly through the hood.

Positioned below the hood is a slab or background G, composed preferably of wired glass. This slab is supported in a fixed position so as to intercept any of the spray which is thrown beyond the work on the rack or table. In front of this slab or background is a curtain or film of liquid adapted to flush the surface of the slab and to absorb the sprayed matter projected toward said slab, said liquid curtain precluding the rebound of the spray from said slab. The liquid is directed against or toward the slab by suitable nozzles or perforations in a horizontal pipe $h$ positioned near the top of the slab, as shown in Fig. 2, and to this pipe is connected a suitable feed pipe $h'$, the latter leading from a water main or other source of liquid supply. If desired, a filter may be used to clarify the water to be supplied to distributing pipe $h$. The water flows in thin streams and continuously against the surface of the slab so as to produce the spray absorbing medium, and this liquid with the waste coloring matter therein is discharged into a suitable gutter or collecting trough I, the latter having a suitable waste connection $i$ leading to a sewer or other place of discharge.

In operation, air under pressure and a liquid coloring matter or glaze are supplied to the nozzle or air brush B which is manipulated in the hand of the workman to project the spray against the surfaces of the objects supported on the rack or table in front of the workman. The exhauster is set in motion to establish the flow of air through the ventilators and the spraying chamber into the hood, and water is supplied by pipe $h$ to distributing pipe H in order to produce the film or curtain of liquid flowing continuously over the surface of slab G. The waste spray is either caught up by the air flowing upwardly into the hood, or is absorbed by the film or curtain of liquid flowing downwardly over the surface of the slab, the spray from the nozzle being directed by the workman toward the work and toward the slab C so that the liquid curtain will intercept and absorb any sprayed matter thrown beyond the work.

Having thus fully described the invention, what I claim as new, and desire to secure by Letters Patent is:

1. The method of eliminating waste sprayed matter during the application of a spray to objects under treatment which consists in intercepting the spray by a spray-absorbing medium toward which the spray is directed.

2. The method of eliminating waste sprayed matter during the application of a spray to objects under treatment which consists in conducting the spraying operation within a substantially closed chamber, and intercepting the waste spray by an absorbing medium toward which the spray is directed.

3. The method of eliminating waste sprayed matter during the application of a spray to objects under treatment which consists in intercepting the spray by a curtain or film composed of an absorbing liquid toward which the spray is projected.

4. The method of eliminating waste sprayed matter during the application of a spray to objects under treatment which consists in conducting the spraying operation within a substantially closed chamber, establishing a flow of a liquid to produce a curtain or film within such chamber, and intercepting the waste spray by such liquid curtain or film, whereby the waste spray is absorbed by the liquid curtain or film.

5. The method of eliminating waste sprayed matter during the application of a spray to objects under treatment which consists in directing the spray toward the objects and toward a panel in the path of the waste spray, and flushing the surface of the panel with a continuously flowing liquid which produces a curtain or film of spray absorbing liquid operating to preclude the rebound of the sprayed matter from the surface of the panel.

6. The method of eliminating waste sprayed matter during the application of a spray to objects under treatment which consists in conducting the spraying operation within a substantially closed chamber, circulating air upwardly through the chamber whereby some of the free waste spray is carried off by such upwardly circulating air, and intercepting the waste spray passing the objects under treatment by a curtain composed of a spray absorbing medium.

7. The method of eliminating waste sprayed matter during the application of a spray to objects under treatment which consists in conducting the spray toward a moving film or curtain of liquid, absorbing the spray passing the objects by such liquid film or curtain, and circulating air through said chamber and around the operator for carrying off the waste sprayed matter which rebounds from the objects.

8. The method of eliminating waste sprayed matter during the application of a spray to objects under treatment which consists in conducting the spraying operation within a substantially closed chamber, and carrying off the waste spray by circulating air and water through said chamber.

In testimony whereof I have signed my name to this specification in the presence of two subscribing witnesses.

HARRY D. LILLIBRIDGE.

Witnesses:
ARTHUR J. PRESTON,
C. W. SMITLEY.